(12) United States Patent
De Wilde et al.

(10) Patent No.: US 8,953,151 B2
(45) Date of Patent: Feb. 10, 2015

(54) METHOD FOR DETERMINING THE PRESENCE OF A TRANSMITTER AND A RECEIVER IN A VEHICLE AND A SYSTEM DESIGNED FOR CARRYING OUT THE SAME

(75) Inventors: Tom Marnix Alexander De Wilde, Hillegom (NL); Patrick Dijkstra, Driebruggen (NL)

(73) Assignee: Stichting Noble House, Hillegom (NL)

( * ) Notice: Subject to any disclaimer, the term of this patent is extended or adjusted under 35 U.S.C. 154(b) by 726 days.

(21) Appl. No.: 13/124,328

(22) PCT Filed: Oct. 20, 2009

(86) PCT No.: PCT/NL2009/050633
§ 371 (c)(1),
(2), (4) Date: Jun. 29, 2011

(87) PCT Pub. No.: WO2010/047588
PCT Pub. Date: Apr. 29, 2010

(65) Prior Publication Data
US 2011/0248879 A1    Oct. 13, 2011

(30) Foreign Application Priority Data
Oct. 20, 2008 (NL) ...................................... 2002116

(51) Int. Cl.
*G01C 3/08* (2006.01)
*G01S 17/93* (2006.01)
(Continued)

(52) U.S. Cl.
CPC ................ *G01S 17/936* (2013.01); *G01C 3/08* (2013.01); *G01S 7/497* (2013.01); *G01S 17/58* (2013.01); *H04B 10/0799* (2013.01); *H04B 10/1123* (2013.01)
USPC .......................... 356/4.01; 701/33.1; 701/301

(58) Field of Classification Search
CPC .......................................................... G01C 3/08
USPC .............................................. 701/33.1; 356/4.1
See application file for complete search history.

(56) References Cited

U.S. PATENT DOCUMENTS 2,433,385 A * 12/1947 Miller ............................ 367/113
3,035,263 A *  5/1962 Lader et al. ..................... 342/95
(Continued)

FOREIGN PATENT DOCUMENTS

EP       1544828 A1    6/2005
GB       1213630       11/1970
(Continued)

OTHER PUBLICATIONS

Bluetooth Sig. Bluetooth Specification Version 2.1 + EDR. Adopted Jul. 26, 2007. Downloaded on Sep. 24, 2013, from https://www.bluetooth.org/en-us/specification/adopted-specifications. 14 pages.*

*Primary Examiner* — Ari M Diacou
(74) *Attorney, Agent, or Firm* — The Webb Law Firm

(57) ABSTRACT

A method for determining the presence of a transmitter and a receiver in a vehicle by means of a central processing unit, wherein said transmitter and receiver are designed for transmitting electromagnetic or optical signals in a predetermined direction and for receiving said signals from substantially the same predetermined direction, respectively, for example for communicating between different vehicles, and wherein said transmitter and receiver are operatively connected to the central processing unit, comprising the steps of: —generation of a signal in the central processing unit; —transmission of a signal by the transmitter in dependence on the signal generated in the central processing unit; —reception by the receiver of the signal from the transmitter; and —determination by the central processing unit of the presence of the transmitter and the receiver in dependence on the signal from the receiver.

4 Claims, 2 Drawing Sheets

(51) Int. Cl.
  *G01S 7/497* (2006.01)
  *H04B 10/079* (2013.01)
  *H04B 10/112* (2013.01)
  *G01S 17/58* (2006.01)

(56) References Cited

U.S. PATENT DOCUMENTS

| | | | | |
|---|---|---|---|---|
| 3,174,147 | A | * | 3/1965 | Khanna et al. ................. 342/146 |
| 3,601,488 | A | * | 8/1971 | Ripart ................................ 356/6 |
| 3,755,814 | A | * | 8/1973 | Alpers ............................ 342/42 |
| 4,225,865 | A | * | 9/1980 | McPherson .................... 342/92 |
| 5,543,799 | A | * | 8/1996 | Heger ............................ 342/85 |
| 6,147,637 | A | * | 11/2000 | Morikawa et al. ............. 342/70 |
| 6,657,583 | B2 | * | 12/2003 | Okamura ....................... 342/135 |
| 7,068,214 | B2 | * | 6/2006 | Kakishita et al. ............. 342/134 |
| 7,623,222 | B2 | * | 11/2009 | Benz et al. .................... 356/5.09 |
| 7,925,251 | B2 | * | 4/2011 | Hochdorf et al. ............. 455/423 |
| 2003/0048434 | A1 | * | 3/2003 | Beller .......................... 356/73.1 |
| 2004/0193372 | A1 | * | 9/2004 | MacNeille et al. ........... 701/213 |
| 2004/0222918 | A1 | * | 11/2004 | Kakishita et al. ............. 342/70 |
| 2005/0228562 | A1 | * | 10/2005 | Sayama et al. ................. 701/36 |
| 2005/0231340 | A1 | * | 10/2005 | Tauchi .......................... 340/435 |
| 2005/0278098 | A1 | * | 12/2005 | Breed ............................ 701/45 |
| 2006/0066473 | A1 | * | 3/2006 | Yokoyama et al. ........... 342/134 |
| 2007/0194923 | A1 | * | 8/2007 | Karr .......................... 340/572.1 |
| 2007/0273575 | A1 | * | 11/2007 | Yang et al. .................... 342/127 |
| 2011/0196568 | A1 | * | 8/2011 | Nickolaou et al. ............. 701/29 |

FOREIGN PATENT DOCUMENTS

| | | |
|---|---|---|
| GB | 2355523 A | 4/2001 |
| WO | 2006024906 A2 | 3/2006 |

* cited by examiner

METHOD FOR DETERMINING THE PRESENCE OF A TRANSMITTER AND A RECEIVER IN A VEHICLE AND A SYSTEM DESIGNED FOR CARRYING OUT THE SAME

BACKGROUND OF THE INVENTION

1) Field of the Invention

The present invention relates to a method for determining the presence of a transmitter and a receiver and to a system designed for carrying out the same. The invention further relates to a central processing unit for use in the method or the system.

2) Description of the Prior Art

At present many vehicles are fitted with a transmitter and a receiver designed for transmitting signals and receiving signals, respectively. The vehicle is to that end provided with a central processing unit, which is operatively connected to the transmitter and the receiver. The transmitter and the receiver are usually mounted at locations in the vehicle where an optimum range for reception and transmission can be realised. To improve said range, a number of receivers and transmitters are usually provided, which receivers and transmitters are mounted at different locations in the vehicle.

Especially in those situations in which a number of transmitters and receivers are used, which may even be detachable, it is difficult for the central processing unit to determine the presence of a transmitter and a receiver.

SUMMARY OF THE INVENTION

The object of the invention is to provide an efficient and simple method for detecting the presence of a transmitter and a receiver.

According to the invention, a method is to that end provided for determining the presence of a transmitter and a receiver by means of a central processing unit, wherein said transmitter and receiver are designed for transmitting electromagnetic or optical signals in a predetermined direction and for receiving said signals from substantially the same predetermined direction, respectively, for example for communicating between different vehicles, and wherein said transmitter and receiver are operatively connected to the central processing unit, comprising the steps of:
  generation of a signal in the central processing unit;
  transmission of a signal by the transmitter in dependence on the signal generated in the central processing unit;
  reception by the receiver of the signal from the transmitter; and
  determination by the central processing unit of the presence of the transmitter and the receiver in dependence on the signal from the receiver.

In this way a very efficient presence determination can be provided, in which the receiver's response to the signal transmitted by the transmitter is used for determining the presence of the transmitter and the receiver. Use of the method according to the invention obviates the need to provide additional means of communication between the transmitter or the receiver and the central processing unit for determining said presence.

It should be noted in this regard that the receiver for determining the aforesaid presence directly receives the signal transmitted by the transmitter. Reflection of the transmitted signals by an external object is not necessary, therefore, so that determination of the presence can take place at all times. It is advantageous in this regard if the transmitter transmits the signal directly to the receiver.

If the transmitter should be absent, for example, or be defective, the transmitter will not transmit a signal, so that the receiver will not receive a signal. Also in the situation in which no receiver is provided, or the receiver is defective, the signal transmitted by the transmitter that is present cannot be received. Furthermore a situation is conceivable in which both the transmitter and the receiver are absent. In all cases, the central processing unit will determine that at least one of said transmitter and said receiver is not present.

It may be advantageous in that regard if the central processing unit determines the presence of the transmitter and receiver at predetermined moments in time. Thus, the central processing unit will for example also be able to detect transmitters and receivers that are absent or are becoming defective in use.

If it is determined by the central processing unit that a transmitter and/or a receiver is not present, the central processing unit can make this known to the driver.

In a preferred embodiment of the method, the transmitter and the receiver are disposed at a distance from the central processing unit in the vehicle, said transmitter and receiver being connected to the central processing unit by conducting means, wherein the method further comprises the steps of:
  conduction of the generated signal from the central processing unit to the transmitter; and
  conduction of the received signal to the central processing unit.

This makes it possible to install the transmitter and the receiver at the front of the vehicle, for example, whilst the central processing unit is located near the driver. The transmitter and the receiver thus have an optimum range. This is advantageous in particular if the central processing unit for example comprises display means for making the absence of the transmitter and/or the receiver known.

In another preferred embodiment of the invention, the method further comprises the steps of:
  determination of a first moment in time upon generation of the signal;
  determination of a second moment in time at the reception by the central processing unit of the signal from the receiver;
  determination of a time period between the first and the second moment in time,
wherein said time period is a measure of the distance between the central processing unit on the one hand and the receiver and the transmitter on the other hand, and wherein said measure is utilized by the central processing unit for setting the mode of operation of the central processing unit.

By determining the time period between the generation of the signal and the reception of the signal by the central processing unit, the distance from the transmitter and the receiver to the central processing unit can be determined. This is advantageous in particular if the vehicle comprises a number of transmitters and receivers, so that the central processing unit can easily determine which transmitter and receiver are mounted at which location in dependence on the distance from the transmitter and the receiver to the central processing unit. In that situation the central processing unit can for example send certain signals only to the transmitter that is mounted at the front of the vehicle.

Another advantage of measuring the length of the wire is that the time delay resulting therefrom can be automatically compensated. In the case of laser pulses from external measuring apparatus being jammed, the point in time at which the pulses were transmitted is very important. The wire causes a delay, whose length is not known and which is thus a random factor, unless the length of the wires is known.

In another preferred embodiment of the method according to the invention, said transmission comprises the transmission of light, in particular laser light, and said reception comprises the reception of light. In said embodiment, the transmitter and the receiver are designed for transmitting and receiving laser light. Such a transmitter and receiver can for example be used in detecting speed checks where use is made of laser light.

In another preferred embodiment of the method according to the invention, said transmission comprises the transmission of radar and/or radio waves, and said reception comprises the reception of radar and/or radio waves.

In another preferred embodiment of the method according to the invention, the central processing unit generates a signal that is provided with a code, wherein the central processing unit reads out said code upon reception of the signal from the receiver. By encoding the generated signal with a code, it can be ensured that the same signal that is transmitted by the transmitter to be tested will also be received again by the receiver to be tested. This prevents the receiver from coincidentally receiving a signal that does not come from the transmitter to be tested upon determining the presence. This is prevented by providing every transmitter and receiver with a unique identification code.

The invention further relates to a system provided with a central processing unit that can be connected to a transmitter and a receiver for transmitting and receiving, respectively, electromagnetic or optical signals, said central processing unit comprising means for generating a signal, said transmitter being designed for transmitting, in dependence on said signal, an electromagnetic or optical signal in a predetermined direction, and said receiver being designed for receiving the signal from substantially the same predetermined direction and supplying it to the central processing unit, wherein the central processing unit is further designed for determining the presence of the transmitter and the receiver independence on the signal supplied by the receiver. Such a transmission and reception system is thus capable to check the presence and/or the operation of the transmitter and the receiver without additional communication between the transmitter or the receiver and the central processing unit, so that a very compact and simple system is provided.

Preferably, the transmitter and the receiver can be connected in a vehicle at a distance from the central processing unit, wherein the transmitter and the receiver comprise conducting means for conducting signals between the transmitter and the receiver on the one hand and the central processing unit on the other hand. This makes it possible to install the transmitter and the receiver at a distance from the central processing unit and thus to improve the range of the transmitter and the receiver. The conducting means preferably comprise electrical and/or optical conducting means. Thus it can be advantageous, if the transmitter and the receiver are designed for transmitting and receiving, respectively, optical signals, to provide optical conducting means as well. Said optical conducting means may comprise glass fibre, for example. If use is for example made of a transmitter and a receiver designed for radio waves and/or radar waves, it will be advantageous to provide electrical conducting means.

More preferably, the central processing unit comprises means for determining a first moment in time of the generation of the signal and a second moment in time of the reception of the signal from the receiver, wherein the central processing unit is further designed for determining the distance between the central processing unit on the one hand and the transmitter and receiver on the other hand in dependence on the time period between said first and said second moment in time. This enables the central processing unit to determine the location of the transmitter and the receiver on the basis of the distance. This is advantageous in particular when a number of transmitters and receivers are provided.

In another preferred embodiment of the system according to the invention, said conducting means are configured as integral conducting means for the transmitter and the receiver. Both the receiver and the transmitter are thus connected to a single conductor, whilst the central processing unit is designed both for conducting a signal to the transmitter via the conductor and for receiving a signal from the receiver. Integral conducting means make it possible to realise a compact assembly.

In another preferred embodiment of the system according to the invention, the transmitter and the receiver extend such that they are at least substantially adjacent to each other. In this way a good reception of the signal transmitted by the transmitter for determining the aforesaid presence can be realised. The transmitter and the receiver preferably extend in such a manner that the signals from the transmitter will be directly incident on the receiver.

In another preferred embodiment of the system according to the invention, the transmitter and the receiver are configured as an integral unit. The transmitter and the receiver are preferably made up of a transducer. The presence of the transducer can in that case be determined by quickly switching between transmission and reception mode. It will be understood that this results in a compact assembly, in particular in combination with the integrally constructed conducting means.

The invention further relates to a vehicle comprising a system according to the invention. A vehicle provided with the system is for example capable of communication with vehicles which are also provided with such a system. The system can also be used for detecting radio signals, optical signals and/or radar signals in the vicinity. The vehicle preferably comprises a number of pairs of transmitters and receivers, more preferably at the front and the rear of the vehicle. Thus, the reception of the signals is improved and the signals can moreover be transmitted in a number of directions, so that there will be a greater chance of reception at the receiving end.

The invention further relates to a central processing unit for use in the vehicle or the method according to the invention.

BRIEF DESCRIPTION OF THE DRAWINGS

The invention will now be explained in more detail with reference to figures of a drawing of preferred embodiments of the invention, in which.

DETAILED DESCRIPTION OF THE PREFERRED EMBODIMENTS

Figure 1:
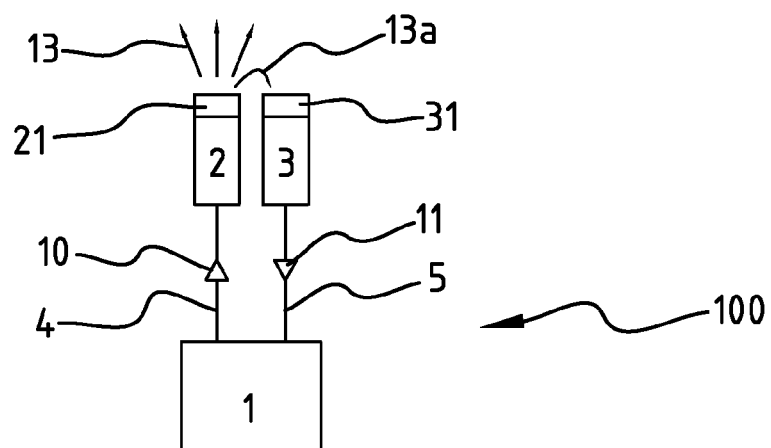
FIG. 1 schematically shows a system according to the invention.

In FIG. 1, a system 100 is shown, which can be connected in a vehicle. The system 100 comprises a central processing unit 1, a transmitter 2 and a receiver 3. In this embodiment, the transmitter 2 and the receiver 3 are designed for transmitting and receiving, respectively, laser light. The transmitter 2 to that end comprises an output 21, whilst the receiver 3 comprises a light-sensitive part 31. The system 100 can for example be used for detecting speed checks in which use is made of lasers.

The transmitter 2 is connected to the central processing unit 1 via conducting means in the form of a connecting wire 4. In a corresponding manner, the receiver 3 is connected to the central processing unit 1 via a connecting wire 5.

According to the invention, a method is provided for determining the presence of the transmitter 2 and the receiver and 3 in the system. The method can also be used for determining whether the transmitter 2 and/or the receiver 3 is (are) still functioning correctly. The central processing unit 1 to that end generates a signal, indicated at 10, which is supplied to the receiver via the connecting wire 4. When the transmitter 2 receives a signal 10, it will transmit optical signals in the form of laser light 13. Since the transmitter 2 is disposed beside the receiver 3, a portion 13a of said laser light 13 will be directly incident on the light sensor 31 of the receiver 3. The receiver 3 will in turn forward the received signal, indicated at 11, to the central processing unit 1 via the wire 5. When the central processing unit 1 receives a signal 11 back in response to a generated signal 10, this means that the central processing unit has determined that the transmitter 2 and the receiver 3 are present in the system 100 and are functioning correctly. In this way a presence test is provided in a simple manner, without additional communication means between the transmitter 2 or the receiver 3 and the central processing unit 1 being required.

Figure 2:
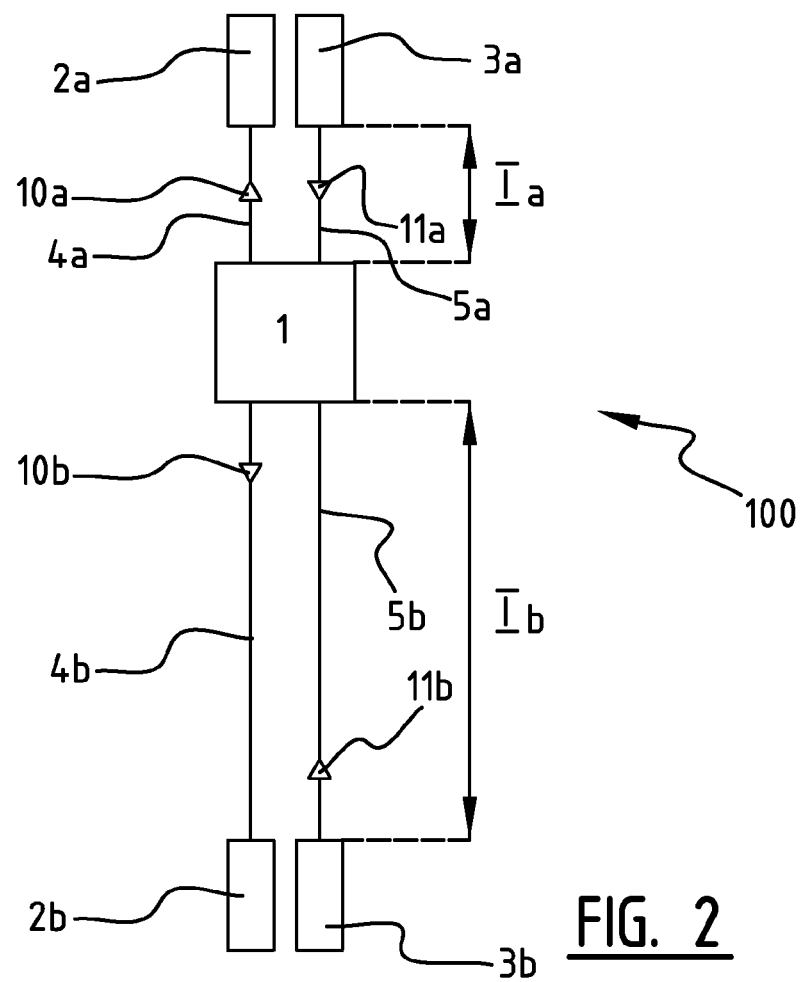
FIG. 2 schematically shows the system of FIG. 1 with an additional transmitter and receiver.

In FIG. 2 a system 100 is shown which comprises two transmitters 2a, 2b and two receivers 3a, 3b. The transmitter 2a and the receiver 3a form a pair and the transmitter 2b and the receiver 3b form a pair. The transmitters and the receivers are connected to the central processing unit 1 via connecting wires 4a, 5a, 4b and 5b. To determine the number of pairs of receivers and transmitters that are present, the central processing unit can make use of the method as described above for each pair.

It is also possible in the system 100 of FIG. 2 to distinguish the pair indicated at a from the pair indicated at b. To that end the central processing unit 1 determines the moment in time of the generation of the signal 10a upon determination of the presence of the transmitter 2a and the receiver 3a. Also the moment in time of the reception of the signal 11a of the receiver 3a is determined by the central processing unit. The difference between the moments in time is a measure of the distance Ia between the central processing unit 1 on the one hand and the transmitter 2a and the receiver 3a on the other hand.

Thus, the time period between the generation of the signal 10b and the reception of the signal 11b upon determining the presence of the transmitter 2b and the receiver 3b will be longer, since the distance Ib is greater. In this way the central processing unit 1 can distinguish between the pair 2a, 3a and the pair 2b, 3b. One pair maybe mounted at the front of a vehicle, for example, whilst the other pair is mounted at the rear of the vehicle.

It may be advantageous to encode a unique code into the signal 10 that is generated in the central processing unit 1. If the central processing unit concludes upon reception of the signal 11 from the receiver 3 that the same code has been encoded into the message 11, this means that it has been ascertained that the signal 13a that has been received by the receiver 3 comes from the transmitter 2 and not from another transmitter that happens to be in the vicinity. In this way it is also possible to distinguish between the signals 11a and 11b from the different pairs as shown in FIG. 2.

Figure 3:
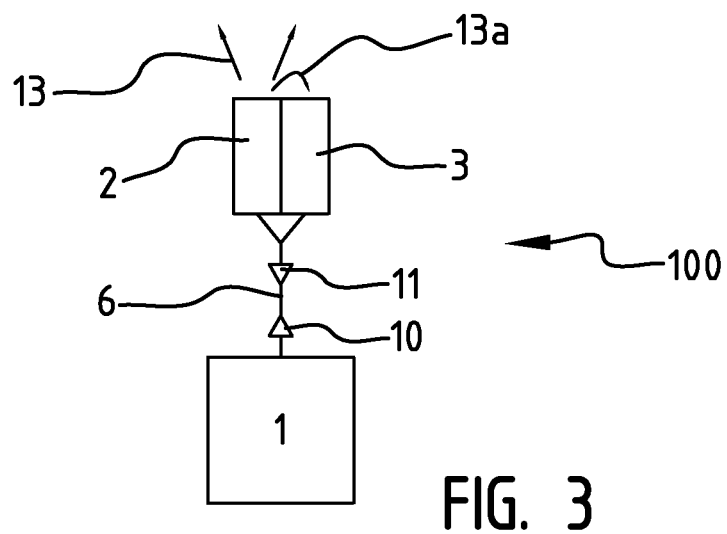
FIGS. 3 and 4 schematically show variants of the system of FIG. 1.

In FIG. 3 the conducting means for the transmitter 2 and the receiver and 3 are configured as integral conducting means. A single connecting wire 6 is in that case provided, at least in part, which connecting wire conducts signals 11 from the receiver 3 as well as signals 10 for the transmitter 2. In the embodiment shown in FIG. 3, the transmitter 2 and the receiver 3 are adjacent to each other, being configured as an integral unit.

Figure 4:
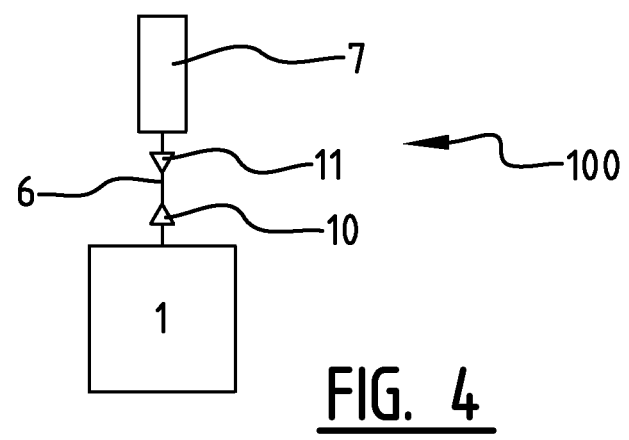

FIG. 4 shows another variant, in which a transducer 7 is used as a transmitter and as a receiver. The transducer is designed for rapid switching between the functions so as to perform said functions even simultaneously. In this way a very compact assembly is provided.

It is noted that the invention is not limited to the embodiments as shown here, but that it also extends to other preferred variants that fall within the scope of the appended claims.

The invention claimed is:

1. A method for determining the presence of and setting a mode of operation for a transmitter and a receiver in a vehicle by a central processing unit, wherein said transmitter and said receiver are designed for transmitting electromagnetic or optical signals in a predetermined direction and for receiving said signals from substantially the same predetermined direction, respectively, wherein the transmitter is further disposed such that a portion of the electromagnetic or optical signals is directly incident on the receiver, wherein the transmitter and the receiver are disposed at a distance from the central processing unit in the vehicle, and wherein said transmitter and said receiver are operatively connected to the central processing unit by a conductor, the method comprising the steps of:

generating a first signal in the central processing unit;

determining, by the central processing unit, a first moment in time based at least partly on the generation of the first signal;

conducting, by the conductor, the first signal from the central processing unit to the transmitter;

transmitting, by the transmitter, a transmitter signal based at least partly on the first signal;

receiving, by the receiver, the transmitter signal from the transmitter;

conducting, by the conductor, a second signal based at least partly on the received transmitter signal to the central processing unit;

determining, by the central processing unit, a second moment in time based at least partly on reception by the central processing unit of the second signal from the receiver;

determining, by the central processing unit, the presence of the transmitter and the receiver based at least partly on the second signal from the receiver; and determining a time period between the first moment in time and the second moment in time, wherein said time period indicates a measure of the distances between the central processing unit and the receiver and the transmitter, and wherein the central processing unit sets the mode of operation based at least partly on the measure of the distance.

2. The method according to claim 1, wherein said transmitter signal comprises light.

3. The method according to claim 1, wherein said transmitter signal comprises at least one of radar and radio waves.

4. The method according to claim 1, wherein the central processing unit encodes the first signal with a code, and wherein the central processing unit checks the second signal from the receiver for said code.

* * * * *